(12) United States Patent
Wang et al.

(10) Patent No.: US 8,717,664 B2
(45) Date of Patent: May 6, 2014

(54) COLOR DISPLAY DEVICE

(71) Applicant: SiPix Imaging, Inc., Fremont, CA (US)

(72) Inventors: Ming Wang, Union City, CA (US); Yu Li, Fremont, CA (US); Hui Du, Milpitas, CA (US); Xiaojia Zhang, Fremont, CA (US)

(73) Assignee: SiPix Imaging, Inc., Fremont, CA (US)

( * ) Notice: Subject to any disclaimer, the term of this patent is extended or adjusted under 35 U.S.C. 154(b) by 0 days.

(21) Appl. No.: 13/633,788

(22) Filed: Oct. 2, 2012

(65) Prior Publication Data

US 2014/0092465 A1    Apr. 3, 2014

(51) Int. Cl.
*G02B 26/00* (2006.01)
*G09G 3/34* (2006.01)

(52) U.S. Cl.
USPC ........... 359/296; 359/228; 359/253; 345/107; 345/690

(58) Field of Classification Search
USPC .................. 359/296, 253, 452; 345/105–107; 252/500, 586; 204/450, 483, 600
See application file for complete search history.

(56) References Cited

U.S. PATENT DOCUMENTS

| | | | |
|---|---|---|---|
| 3,756,693 A | 9/1973 | Ota | |
| 3,892,568 A | 7/1975 | Ota | |
| 4,298,448 A | 11/1981 | Muller et al. | |
| 5,378,574 A | 1/1995 | Winnik et al. | |
| 5,980,719 A | 11/1999 | Cherukuri et al. | |
| 6,198,809 B1 | 3/2001 | Disanto et al. | |
| 6,337,761 B1 | 1/2002 | Rogers et al. | |
| 6,373,461 B1 | 4/2002 | Hasegawa et al. | |
| 6,486,866 B1 | 11/2002 | Kuwahara et al. | |
| 6,525,866 B1 | 2/2003 | Lin et al. | |
| 6,538,801 B2 | 3/2003 | Jacobson et al. | |
| 6,600,534 B1 | 7/2003 | Tanaka et al. | |
| 6,650,462 B2 | 11/2003 | Katase | |
| 6,693,620 B1 | 2/2004 | Herb et al. | |
| 6,704,133 B2 | 3/2004 | Gates et al. | |
| 6,724,521 B2 | 4/2004 | Nakao et al. | |
| 6,729,718 B2 | 5/2004 | Goto et al. | |
| 6,751,007 B2 | 6/2004 | Liang et al. | |
| 6,829,078 B2 | 12/2004 | Liang et al. | |
| 6,864,875 B2 | 3/2005 | Drzaic et al. | |
| 6,930,818 B1 | 8/2005 | Liang et al. | |
| 7,009,756 B2 | 3/2006 | Kishi et al. | |
| 7,034,987 B2 | 4/2006 | Schlangen | |
| 7,038,655 B2 | 5/2006 | Herb et al. | |

(Continued)

FOREIGN PATENT DOCUMENTS

CN    1617033    5/2005
EP    1 089 118    4/2001

(Continued)

OTHER PUBLICATIONS

U.S. Appl. No. 13/225,184, filed Sep. 2, 2011, Wang et al.

(Continued)

*Primary Examiner* — Loha Ben
(74) *Attorney, Agent, or Firm* — Perkins Coie LLP

(57) ABSTRACT

The present invention provides a solution for a highlight or multicolor display device, in which each display cell can display high quality color states. More specifically, an electrophoretic fluid is provided which comprises three types of pigment particles, having different levels of size, threshold voltage or charge intensity.

22 Claims, 8 Drawing Sheets

(56) References Cited

U.S. PATENT DOCUMENTS

| | | |
|---|---|---|
| 7,038,656 B2 | 5/2006 | Liang et al. |
| 7,038,670 B2 | 5/2006 | Liang et al. |
| 7,046,228 B2 | 5/2006 | Liang et al. |
| 7,050,218 B2 | 5/2006 | Kanbe |
| 7,075,502 B1 | 7/2006 | Drzaic et al. |
| 7,226,550 B2 | 6/2007 | Hou et al. |
| 7,271,947 B2 | 9/2007 | Liang et al. |
| 7,283,199 B2 | 10/2007 | Aichi et al. |
| 7,312,916 B2 * | 12/2007 | Pullen et al. .................. 359/296 |
| 7,342,556 B2 | 3/2008 | Oue et al. |
| 7,365,732 B2 | 4/2008 | Matsuda et al. |
| 7,411,719 B2 | 8/2008 | Paolini et al. |
| 7,417,787 B2 | 8/2008 | Chopra et al. |
| 7,492,505 B2 | 2/2009 | Liang et al. |
| 7,545,557 B2 | 6/2009 | Iftime et al. |
| 7,548,291 B2 | 6/2009 | Lee et al. |
| 7,557,981 B2 | 7/2009 | Liang et al. |
| 7,652,656 B2 * | 1/2010 | Chopra et al. ................ 345/107 |
| 7,679,599 B2 | 3/2010 | Kawai |
| 7,679,813 B2 | 3/2010 | Liang et al. |
| 7,760,419 B2 | 7/2010 | Lee |
| 7,821,702 B2 | 10/2010 | Liang et al. |
| 7,830,592 B1 | 11/2010 | Sprague et al. |
| 7,852,547 B2 | 12/2010 | Kim |
| 7,852,548 B2 | 12/2010 | Roh |
| 7,982,941 B2 | 7/2011 | Lin et al. |
| 8,054,288 B2 * | 11/2011 | Sugita et al. .................. 345/107 |
| 8,072,675 B2 | 12/2011 | Lin et al. |
| 8,115,729 B2 * | 2/2012 | Danner et al. ................ 345/107 |
| 8,120,838 B2 | 2/2012 | Lin et al. |
| 8,159,636 B2 | 4/2012 | Sun et al. |
| 8,169,690 B2 | 5/2012 | Lin et al. |
| 8,237,892 B1 | 8/2012 | Sprague et al. |
| 8,395,836 B2 | 3/2013 | Lin et al. |
| 8,422,116 B2 | 4/2013 | Sprague et al. |
| 8,477,405 B2 * | 7/2013 | Ishii et al. ..................... 359/296 |
| 8,520,296 B2 | 8/2013 | Wang et al. |
| 8,570,272 B2 | 10/2013 | Hsieh et al. |
| 2002/0033792 A1 | 3/2002 | Inoue |
| 2002/0171620 A1 | 11/2002 | Gordon et al. |
| 2003/0002132 A1 | 1/2003 | Foucher et al. |
| 2003/0095094 A1 | 5/2003 | Goden |
| 2003/0107631 A1 | 6/2003 | Goto et al. |
| 2003/0132908 A1 | 7/2003 | Herb et al. |
| 2004/0051935 A1 | 3/2004 | Katase |
| 2004/0113884 A1 | 6/2004 | Albert et al. |
| 2004/0136048 A1 | 7/2004 | Arango et al. |
| 2004/0190115 A1 | 9/2004 | Liang et al. |
| 2004/0252361 A1 | 12/2004 | Machida et al. |
| 2004/0263947 A1 | 12/2004 | Drzaic et al. |
| 2005/0151709 A1 | 7/2005 | Jacobson et al. |
| 2005/0190431 A1 | 9/2005 | Matsuda |
| 2006/0197738 A1 | 9/2006 | Kawai |
| 2007/0002008 A1 | 1/2007 | Tam |
| 2007/0080928 A1 | 4/2007 | Ishii et al. |
| 2007/0268556 A1 | 11/2007 | Chopra et al. |
| 2007/0273637 A1 | 11/2007 | Zhou et al. |
| 2008/0042928 A1 | 2/2008 | Schlangen et al. |
| 2008/0174531 A1 | 7/2008 | Sah |
| 2009/0034054 A1 | 2/2009 | Ikegami et al. |
| 2009/0251763 A1 | 10/2009 | Sprague et al. |
| 2010/0103502 A1 | 4/2010 | Jacobson et al. |
| 2010/0165005 A1 | 7/2010 | Sprague |
| 2010/0165448 A1 | 7/2010 | Sprague |
| 2011/0217639 A1 | 9/2011 | Sprague |
| 2011/0261433 A1 | 10/2011 | Sprague et al. |
| 2011/0292094 A1 | 12/2011 | Lin |
| 2012/0007897 A1 | 1/2012 | Yang et al. |
| 2012/0200610 A1 * | 8/2012 | Sakamoto et al. ............. 345/690 |
| 2012/0256893 A1 * | 10/2012 | Sakamoto et al. ............. 345/208 |

FOREIGN PATENT DOCUMENTS

| | | |
|---|---|---|
| JP | 2004-20818 | 6/2002 |
| JP | 2008-033335 | 2/2008 |
| JP | 2009-116041 A | 5/2009 |
| JP | 2009-192637 A | 8/2009 |
| KR | 10-2007-0082680 A | 8/2007 |
| KR | 10-2008-0023913 | 3/2008 |
| WO | WO 99/53373 | 10/1999 |
| WO | WO 03/016993 | 2/2003 |
| WO | WO 2007/013682 | 2/2007 |
| WO | WO 2009/105385 | 8/2009 |
| WO | WO 2009/124142 | 10/2009 |
| WO | WO 2009/134889 | 11/2009 |
| WO | WO 2010/027810 | 3/2010 |

OTHER PUBLICATIONS

U.S. Appl. No. 13/370,186, filed Feb. 9, 2012, Wang et al.
U.S. Appl. No. 13/371,293, filed Feb. 10, 2010, Zhang et al.
U.S. Appl. No. 13/482,913, filed May 29, 2012, Sprague.
U.S. Appl. No. 13/551,541, filed Jul. 17, 2012, Yang et al.
U.S. Appl. No. 13/875,145, filed May 1, 2013, Wang et al.
U.S. Appl. No. 13/973,712, filed Aug. 22, 2013, Zang et al.
PCT/US2013/062915 Notification of Transmittal of the International Search Report and the Wirtten Opinion of the International Searching Authority, or the Declaration, mailed on Jan. 28, 2014.

* cited by examiner

COLOR DISPLAY DEVICE

FIELD OF THE INVENTION

The present invention is directed to a color display device in which each display cell can display high quality color states, and an electrophoretic fluid for such an electrophoretic display.

BACKGROUND OF THE INVENTION

In order to achieve a color display, color filters are often used. The most common approach is to add color filters on top of black/white sub-pixels of a pixellated display to display the red, green and blue colors. When a red color is desired, the green and blue sub-pixels are turned to the black state so that the only color displayed is red. When the black state is desired, all three-sub-pixels are turned to the black state. When the white state is desired, the three sub-pixels are turned to red, green and blue, respectively, and as a result, a white state is seen by the viewer.

The biggest disadvantage of such a technique is that since each of the sub-pixels has a reflectance of about one third ($\frac{1}{3}$) of the desired white state, the white state is fairly dim. To compensate this, a fourth sub-pixel may be added which can display only the black and white states, so that the white level is doubled at the expense of the red, green or blue color level (where each sub-pixel is only one fourth [$\frac{1}{4}$] of the area of the pixel). Brighter colors can be achieved by adding light from the white pixel, but this is achieved at the expense of color gamut to cause the colors to be very light and unsaturated. A similar result can be achieved by reducing the color saturation of the three sub-pixels. Even with this approach, the white level is normally substantially less than half of that of a black and white display, rendering it an unacceptable choice for display devices, such as e-readers or displays that need well readable black-white brightness and contrast.

SUMMARY OF THE INVENTION

The present invention not only provides a realistic solution for a color display device in which each display cell can display highly saturated color states, but also eliminates the need of color filters.

More specifically, the present invention is directed to an electrophoretic fluid comprising a first type of pigment particles, a second type of pigment particles and third type of pigment particles, all of which are dispersed in a solvent or solvent mixture, wherein:

(a) the first type of pigment particles and the second type of pigment particles carry opposite charge polarities;

(b) the third type of pigment particles is slightly charged; and (c) the three types of pigment particles have different levels of threshold voltage, or different levels of mobility, or both.

In one embodiment, the first type of pigment particles and the second type of pigment particles are of the black and white colors, respectively.

In one embodiment, the third type of pigment particles is non-white and non-black.

In one embodiment, the third type of pigment particles is of a color selected from the group consisting red, green and blue.

In one embodiment, the three types of pigment particles have different levels of threshold voltage. One of the first type or second type of particles may have a threshold voltage. The third type of particles may be larger than the first or the second type of particles. The third type of particles may be about 2 to about 50 times larger than the first or second type of particles. The third type of particles may carry the same charge polarity as the type of particles which has a threshold voltage. The third type of particles may have a charge level being less than about 50% the charge intensity of the first type or second type of particles.

In one embodiment, the three types of pigment particles have different levels of mobility. The charge intensity of the first type of pigment particles may be at least about 2 times the charge intensity of the second type of pigment particles and the charge intensity of the third type of particles may be about 50% less than the charge intensity of the second type of particles. The third type of particles may be larger than the first or the second type of particles. The third type of particles may be about 2 to about 50 times larger than the first or second type of particles.

Figure 8:
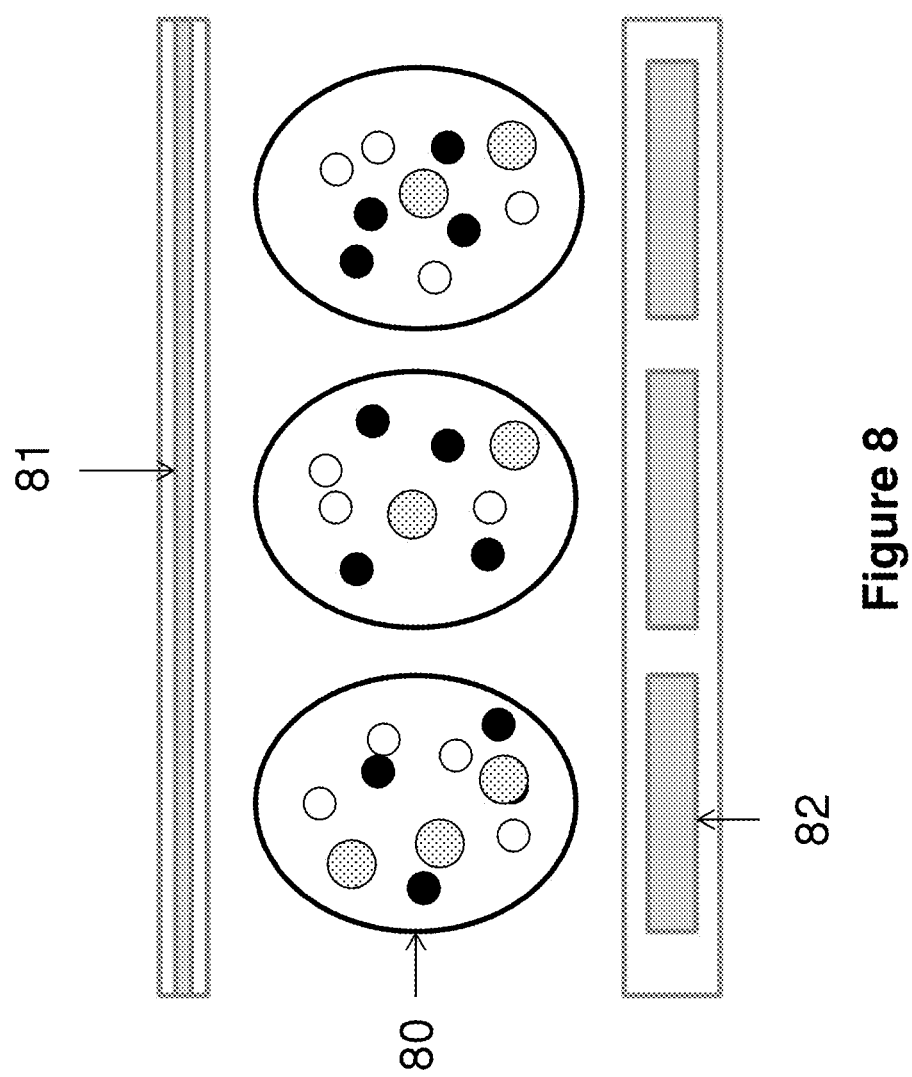
FIG. 8 depicts an electrophoretic display device of the present invention where the display cells are microcapsules.

In one embodiment, the fluid of the present invention is filled in display cells, which are sandwiched between a common electrode layer and a layer of pixel electrodes. The display cells may be microcups or microcapsules. For example, the fluid is filled in microcapsules (80), which are sandwiched between a common electrode (81) and a layer of pixel electrodes (82) (see FIG. 8).

In one embodiment, the display cells are aligned with the pixel electrodes. In another embodiment, the display cells are not aligned with the pixel electrodes.

In one embodiment, the third type of pigment particles is of the same color in all display cells. In another embodiment, the third type of pigment particles is of different colors in display cells.

Figure 1:
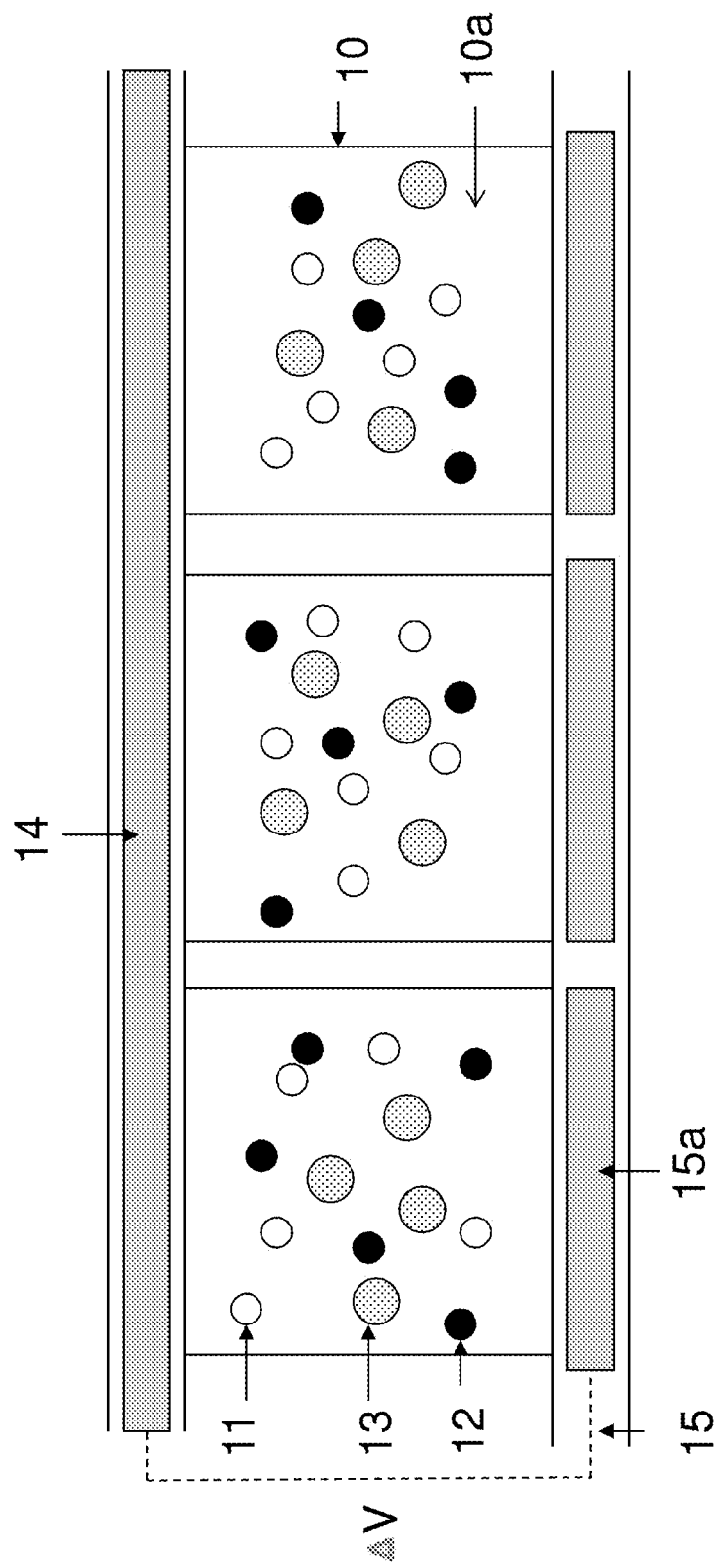
FIG. 1 depicts an electrophoretic display device of the present invention.

In one embodiment, the fluid of the present invention is driven by a voltage potential difference (ΔV) between the common electrode and the pixel electrode (see FIG. 1). In another embodiment, there are at least three different levels of voltage potential difference applied to the common electrode layer and the pixel electrode.

DETAILED DESCRIPTION OF THE INVENTION

The present inventors have proposed a new architecture for color displays.

The electrophoretic fluid (10) of present invention comprises three types of pigment particles dispersed in a dielectric solvent or solvent mixture (10*a*). For ease of illustration, the three types of pigment particles may be referred to as white particles (11), black particles (12) and colored particles (13), as shown in FIG. 1. However, it is understood that the scope of the invention broadly encompasses pigment particles of any colors as long as the three types of pigment particles have visually contrasting colors.

The display fluid is sandwiched between two electrode layers. One of the electrode layers is a common electrode (14) which is a transparent electrode layer (e.g., ITO), spreading over the entire top of the display device. The other electrode layer (15) is a layer of pixel electrodes (15a).

The pixel electrodes are described in U.S. Pat. No. 7,046,228, the content of which is incorporated herein by reference in its entirety. It is noted that while active matrix driving with a thin film transistor (TFT) backplane is mentioned for the layer of pixel electrodes, the scope of the present invention encompasses other types of electrode addressing as long as the electrodes serve the desired functions.

For the white particles (11), they may be formed from an inorganic pigment, such as $TiO_2$, $ZrO_2$, $ZnO$, $Al_2O_3$, $Sb_2O_3$, $BaSO_4$, $PbSO_4$ or the like.

For the black particles (12), they may be formed from CI pigment black 26 or 28 or the like (e.g., manganese ferrite black spinel or copper chromite black spinel) or carbon black.

The third type of pigment particles may be of a color such as red, green, blue, magenta, cyan or yellow. The pigments for this type of particles may include, but are not limited to, CI pigment PR 254, PR122, PR149, PG36, PG58, PG7, PB28, PB15:3, PY138, PY150, PY155 or PY20. Those are commonly used organic pigments described in color index handbook "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

The percentages of the three types of pigment particles in the fluid may vary. For example, the black particle may take up about 0.1% to 10%, preferably 0.5% to 5% by volume of the electrophoretic fluid; the white particle may take up about 1% to 50%, preferably 5% to 15% by volume of the fluid; and the colored particle may take up 2% to 20%, preferably 4% to 10% by volume of the fluid.

There may be other particulate matters in the fluid which are included as additives to enhance performance of the display device, such as switching speed, imaging bistability and reliability.

The solvent in which the three types of pigment particles are dispersed is clear and colorless. It preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil; silicon fluids; aromatic hydrocarbons such as toluene, xylene, phenylxylylethane, dodecylbenzene and alkylnaphthalene; halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane, pentachlorobenzene; and perfluorinated solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoro-ethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-corning (DC-200).

Two of the three types of pigment particles carry opposite charge polarities and the third type of pigment particles is slightly charged. The term "slightly charged" is defined in sections below.

For example, if the black particles are positively charged and the white particles are negatively charged, and then the colored pigment particles are slightly charged. In other words, in this example, the charge carried by the black and the white particles is much more intense than the charge carried by the colored particles.

In addition, the third type of particles which carries a slight charge has a charge polarity which is the same as the charge polarity carried by either one of the other two types of the stronger charged particles.

The three types of pigment particles may have varying sizes. In one embodiment, one of the three types of pigment particles is larger than the other two types.

It is noted that among the three types of pigment particles, the one type of particles which is slightly charged preferably has the larger size.

For example, both the black and the white particles are relatively small and their sizes (tested through dynamic light scattering) may range from about 50 nm to about 800 nm and more preferably from about 200 nm to about 700 nm, and in this example, the colored particles which are slightly charged, preferably are about 2 to about 50 times and more preferably about 2 to about 10 times larger than the black particles and the white particles.

The term "threshold voltage", in the context of the present invention, is defined as the maximum bias voltage that may be applied to a group of pigment particles, without causing the pigment particles to appear at the viewing side of the display device. The term "viewing side" refers to a side of a display device where images are seen by the viewers.

In the present invention, at least one of the three types of pigment particles may demonstrate a threshold voltage under triangle voltage driving testing.

The threshold voltage is either an inherent characteristic of the charged pigment particles or an additive-induced property.

In the former case, the threshold is generated, relying on certain attraction force between particles or between particles and certain substrate surfaces. A threshold may also be generated via interaction of two types of oppositely charged particles.

In the latter case referred to above, to achieve a threshold voltage, a threshold agent which induces or enhances the threshold characteristics of an electrophoretic fluid may be added. The threshold agent may be any material which is soluble or dispersible in the solvent or solvent mixture of the electrophoretic fluid and carries or induces a charge opposite to that of the charged pigment particles. The threshold agent may be sensitive or insensitive to the change of applied voltage. The term "threshold agent" may broadly include dyes or pigments, electrolytes or polyelectrolytes, polymers, oligomers, surfactants, charge controlling agents and the like.

Additional information relating to the threshold agent may be found in U.S. Pat. No. 8,115,729, the content of which is incorporated herein by reference in its entirety.

The following are a few examples illustrating the present invention.

EXAMPLES

Example 1(a)

Figure 2:
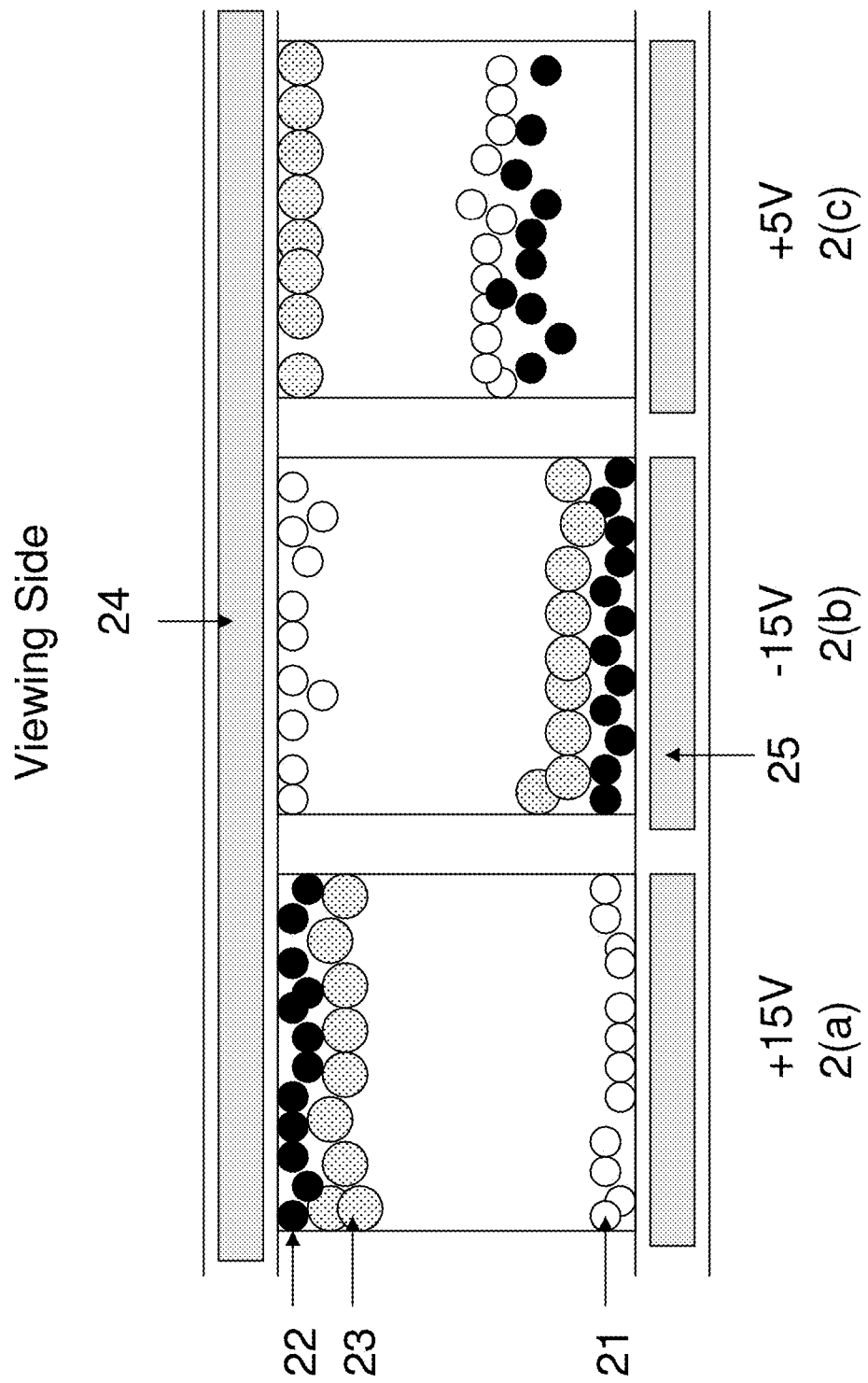
FIG. 2(a)-2(c), 3(a)-3(c) and 4(a)-4(c) depict one embodiment of the present invention.

This example is demonstrated in FIGS. 2(a)-2(c). The black particles (22) are assumed to have a threshold voltage of 5V. Therefore, the black particles (22) would not move to the viewing side if an applied voltage potential difference is 5V or lower.

The white pigment particles (21) are negatively charged while the black pigment particles (22) are positively charged, and both types of the pigment particles are smaller than the colored particles (23).

The colored particles (23) carry the same charge polarity as the black particles which have the threshold voltage, but are slightly charged. The term "slightly charged" is intended to refer to the charge level of the particles being less than about 50%, preferably about 5% to about 30%, the charge intensity of the black or the white particles. As a result, the black particles move faster than the colored particles (23), when an applied voltage potential is higher than the threshold voltage of the black particles because of the stronger charge intensity they carry.

In FIG. 2a, the applied voltage potential is +15V. In this case, the white particles (21) move to be near or at the pixel electrode (25) and the black particles (22) and the colored particles (23) move to be near or at the common electrode (24). As a result, the black color is seen at the viewing side. The colored particles (23) move towards the common electrode (24); however because their lower charge intensity and larger size, they move slower than the black particles.

In FIG. 2b, when a voltage potential difference of −15V is applied, the white particles (21) move to be near or at the common electrode (24) and the black particles and the colored particles move to be near or at the pixel electrode (25). As a result, the white color is seen at the viewing side.

The colored particles (23) move towards the pixel electrode because they are also positively charged. However, because of their lower charge intensity and larger size, they move slower than the black particles.

In FIG. 2c, the applied voltage potential difference has changed to +5V. In this case, the negatively charged white particles (21) move towards the pixel electrode (25). The black particles (22) move little because of their threshold voltage being 5V. Due to the fact that the colored particles (23) do not have a significant threshold voltage, they move to be near or at the common electrode (24) and as a result, the color of the colored particles is seen at the viewing side.

Example 1(b)

Figure 3:
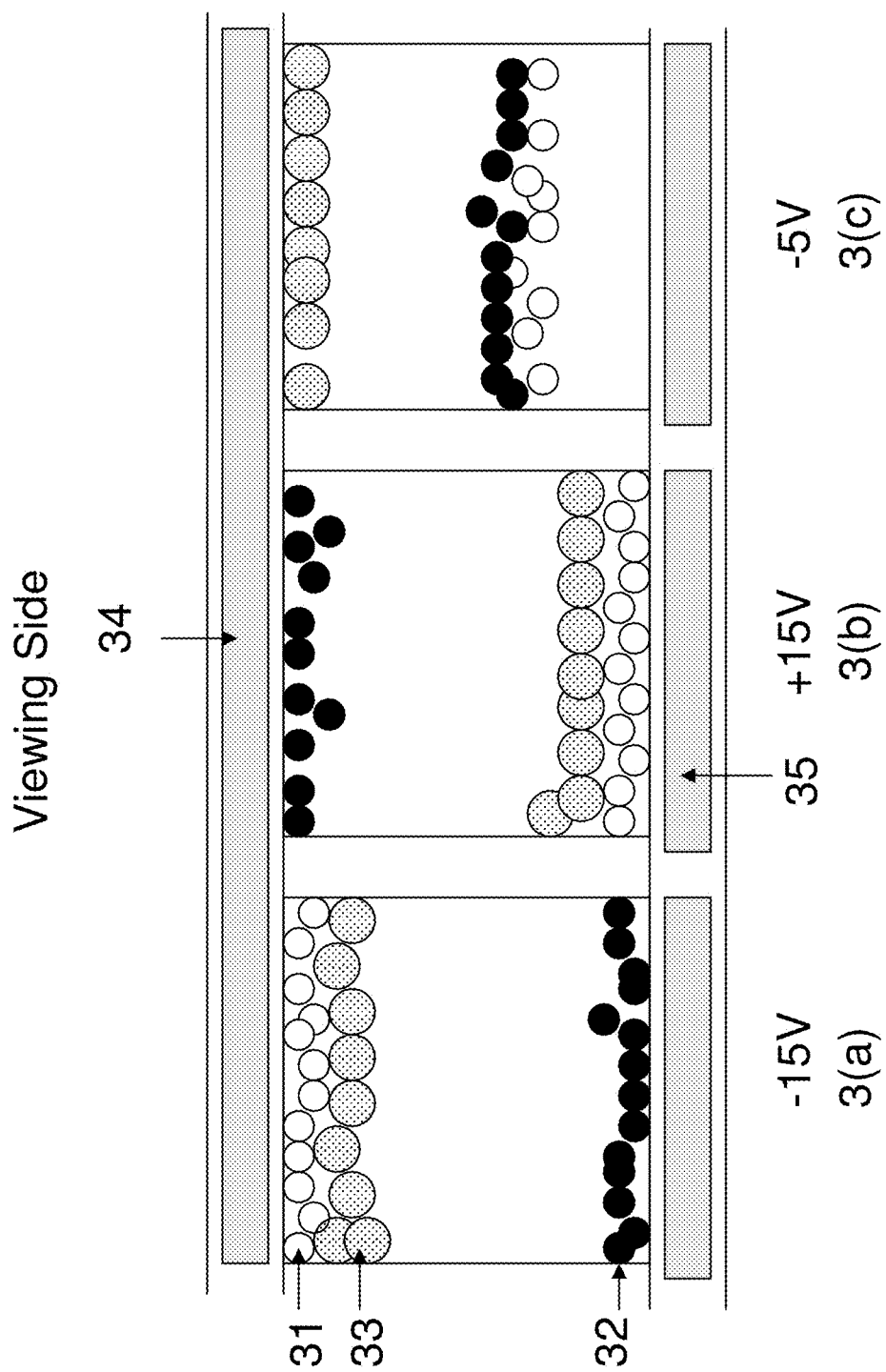

In an alternative design as demonstrated in FIGS. 3(a)-3(c), the white particles (31) are assumed to have a threshold voltage of 5V. Therefore, the white particles (31) would not move to the viewing side if an applied voltage potential difference is 5V or lower.

The white pigment particles (31) are negatively charged while the black pigment particles (32) are positively charged, and both types of the pigment particles are smaller than the colored particles (33).

The colored particles (33) carry the same charge polarity as the white particles which have the threshold voltage, but are slightly charged. The term "slightly charged" is as defined in Example 1(a) above. As a result, the white particles move faster than the colored particles (33), when an applied voltage potential is higher than the threshold voltage of the white particles because of the stronger charge intensity they carry.

In FIG. 3a, the applied voltage potential is −15V. In this case, the black particles (32) move to be near or at the pixel electrode (35) and the white particles (31) and the colored particles (33) move to be near or at the common electrode (34). As a result, the white color is seen at the viewing side. The colored particles (33) move towards the common electrode (34); however because of their lower charge intensity and larger size, they move slower than the white particles.

In FIG. 3b, when a voltage potential difference of +15V is applied, the white particles (31) move to be near or at the pixel electrode (35) and the black particles move to be near or at the common electrode (34). As a result, the black color is seen at the viewing side.

The colored particles (33) move towards the pixel electrode as they are also negatively charged. However, because of their lower charge intensity and larger size, they move slower than the white particles.

In FIG. 3c, the applied voltage potential difference has changed to −5V. In this case, the positively charged black particles (32) move towards the pixel electrode (35). The white particles (32) move little because of their threshold voltage being 5V. Due to the fact that the colored particles (33) do not have a significant threshold voltage, they move to be near or at the common electrode (34) and as a result, the color of the colored particles is seen at the viewing side.

Example 1(c)

Figure 4:
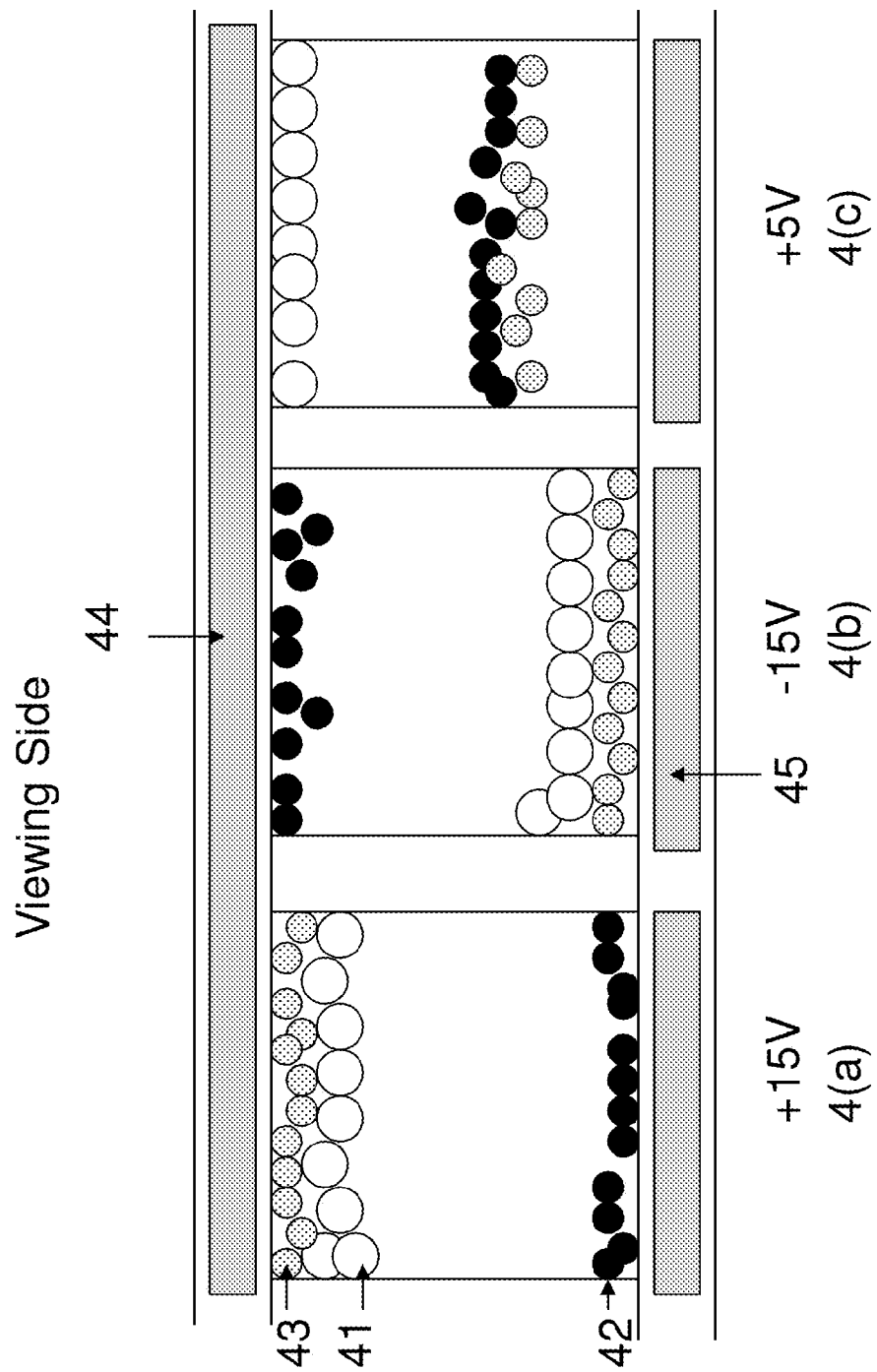

It is also possible to have the colored particles to have a threshold voltage, as shown in FIGS. 4(a)-4(c). In this case, the colored particles (43) would not move to the viewing side if an applied voltage potential difference is 5V or lower.

The black pigment particles (42) are negatively charged while the colored pigment particles (43) are positively charged, and both types of the pigment particles are smaller than the white particles (41).

The white particles (41) carry the same charge polarity as the colored particles which have the threshold voltage, but are slightly charged. The term "slightly charged" is as defined in Example 1(a) above. As a result, the colored particles move faster than the white particles (41), when an applied voltage potential is higher than the threshold voltage of the colored particles because of the stronger charge intensity they carry.

In FIG. 4a, the applied voltage potential is +15V. In this case, the black particles (42) move to be near or at the pixel electrode (45) and the colored particles (43) and the white particles (41) move to be near or at the common electrode (44). As a result, the color of the colored particles is seen at the viewing side. The white particles (41) move towards the common electrode (44); however because of their lower charge intensity and larger size, they move slower than the colored particles.

In FIG. 4b, when a voltage potential difference of −15V is applied, the colored particles (43) move to be near or at the pixel electrode (45) and the black particles move to be near or at the common electrode (44). As a result, the black color is seen at the viewing side.

The white particles (41) move towards the pixel electrode as they are also positively charged. However, because of their lower charge intensity and larger size, they move slower than the colored particles.

In FIG. 4c, the applied voltage potential difference has changed to +5V. In this case, the negatively charged black particles (42) move towards the pixel electrode (45). The colored particles (43) move little because of their threshold voltage being 5V. Due to the fact that the white particles (41) do not have a significant threshold voltage, they move to be near or at the common electrode (44) and as a result, the white color is seen at the viewing side.

In an alternative embodiment of the present invention, all three types of pigment particles have different levels of charge intensity, thus different levels of mobility.

For example, the first and second types of particles carry opposite charge polarities and the charge intensity of first type of particles is at least about 2 times, preferably about 3 to about 15 times, the charge intensity of the second type of particles, or vice versa. The charge intensity of the third type of particles is less than about 50%, preferably about 5% to about 30%, the charge intensity of the first or second type of particles, whichever has a lower charge intensity. In a specific example, if black particles have twice the charge intensity of the white particles, then the colored particles may have less than 50% the charge intensity of the white particles.

The particles that carry the least charge intensity are preferably larger than the other two types of particles.

Due to different levels of charge intensity, the three types of pigment particles would have different levels of mobility. The higher the charge intensity, the faster the particles move. The following example demonstrates this embodiment of the invention.

Example 2

Figure 5:
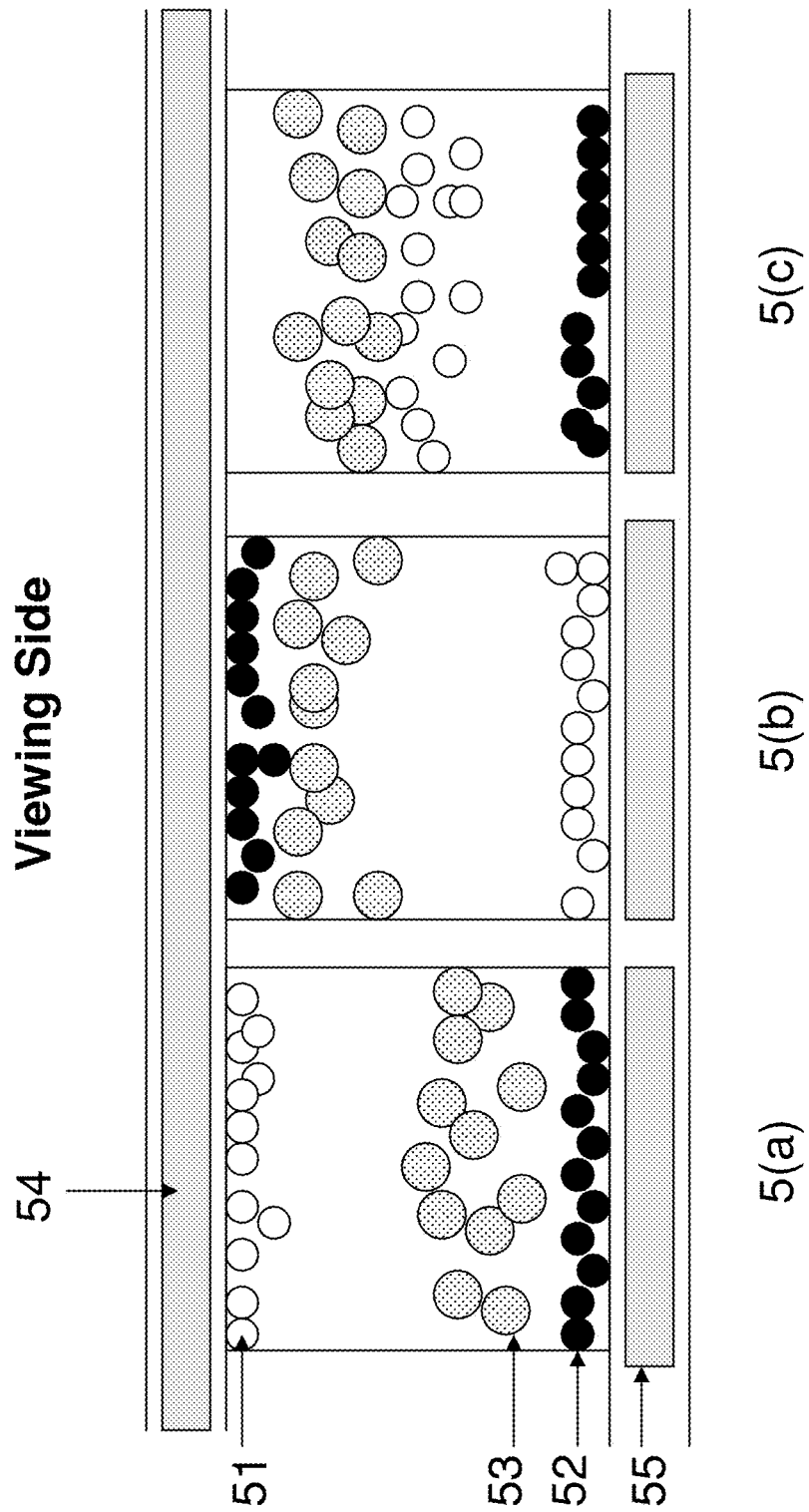
FIGS. 5(a)-5(c) depict an alternative embodiment of the present invention.

This example is shown in FIGS. 5(a)-5(c). It is assumed that the charge intensity of the black particles (52) is twice the charge intensity of the white particles (51) and therefore the black particles move twice as fast as the white particles. The colored particles (53) have a charge intensity which is less than 50% the charge intensity of the white particles.

Therefore if it takes a driving time, t, for the black particles to travel the distance between the common electrode and a pixel electrode ("d"), it would then take 2 t for the white particles and at least 4 t for the colored particles, to travel the same distance, d.

In addition, the black particles are positively charged and the white particles are negatively charged. The colored particles carry the same charge polarity as the particles having the highest intensity, that is, the black particles in this case.

In FIG. 5a, when a negative voltage potential is applied to the common electrode (54) and the pixel electrode (55), after a driving time of 2 t, the white pigment particles (51) would be near or at the common electrode (i.e., the viewing side) and the black pigment particles (52) would be near or at the pixel electrode. As a result, the white color state is seen. The colored particles (53), due to their larger size and lower charge intensity/lower mobility, they would move a little. In addition, because they are positively charged, they would move towards the pixel electrode (55).

In FIG. 5b, when a positive voltage potential is applied to the common electrode (54) and the pixel electrode (55), after a driving time of 2 t, the black pigment particles (52) would be near or at the common electrode and the white pigment particles (51) would be near or at the pixel electrode. As a result, the black color state is seen.

Because of their low charge intensity and low mobility, the colored particles barely move. While the black and colored particles carry the same charge polarity, the black particles would move to be closer to the common electrode because of their higher charge intensity and smaller size.

Before the step of FIG. 5c, it is preferred that the white particles are at or near the pixel electrode (55) and the black and colored particles are at or near the common electrode (54). In FIG. 5c, when a negative voltage potential is applied between the common electrode (54) and the pixel electrode (55), after a driving time of t, the white particles (51) at the bottom would move to an area between the common electrode and the pixel electrode, about at the mid-level, while the black particles (52) would travel the full distance, d, to be at or near the pixel electrode. The colored particles would travel a short distance downward; but remain closer to the common electrode. As a result, the color of the colored particles (53) is seen at the viewing side.

As shown in this example, the switching among three optical states therefore could be achieved by controlling the driving time frame, driving amplitude or both.

The larger and slower moving particles in this example are the colored particles. However, the designs may vary depending on the needs. It is also possible to make the black or white particles the larger and slower moving particles.

The electrophoretic fluid in an electrophoretic display device is filled in display cells. The display cells may be microcups as described in U.S. Pat. No. 6,930,818, the content of which is incorporated herein by reference in its entirety. The display cells may also be other types of microcontainers, such as microcapsules, microchannels or equivalents, regardless of their shapes or sizes. All of these are within the scope of the present application.

Figure 6:
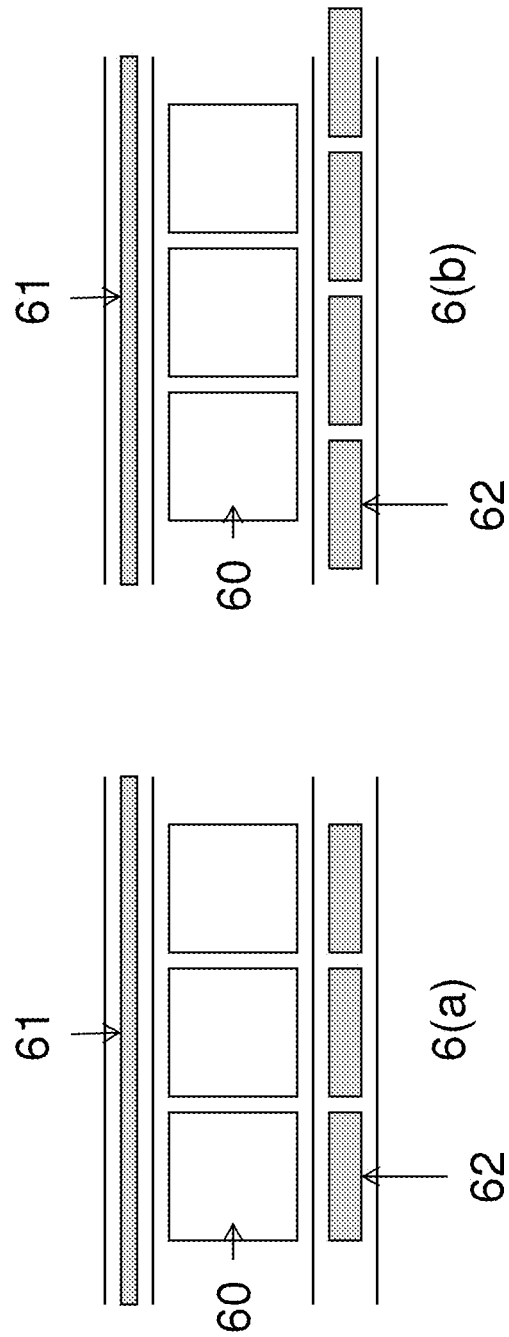
FIGS. 6(a) and 6(b) show two options where the display cells are aligned or unaligned, respectively, with the pixel electrodes.

In one embodiment of the present invention, the display device utilizing the present electrophoretic fluid is a highlight display device and in this embodiment, the colored particles are of the same color in all display cells. Each display cell would be a pixel in such a highlight display device. In addition, as shown in FIGS. 6(a) and 6(b), where display cells (60) are sandwiched between a common electrode (61) and a layer of pixel electrodes (62), the display cells may be aligned with the pixel electrodes (see FIG. 6a) or un-aligned with the pixel electrodes (see FIG. 6b).

In another embodiment, the display device utilizing the present electrophoretic fluid may be a multi-color display device. In this embodiment, the colored particles are of different colors in the display cells. In this embodiment, the display cells and the pixel electrodes are aligned.

FIGS. 7(a)-7(e) illustrate how multiple colors are displayed with a display device of the present invention. Each display cell represents a sub-pixel and each pixel has three sub-pixels. The three display cells, each representing a sub-pixel, are filled with an electrophoretic fluid of the present invention in which the third type of pigment particles is red, green and blue, respectively.

Figure 7:
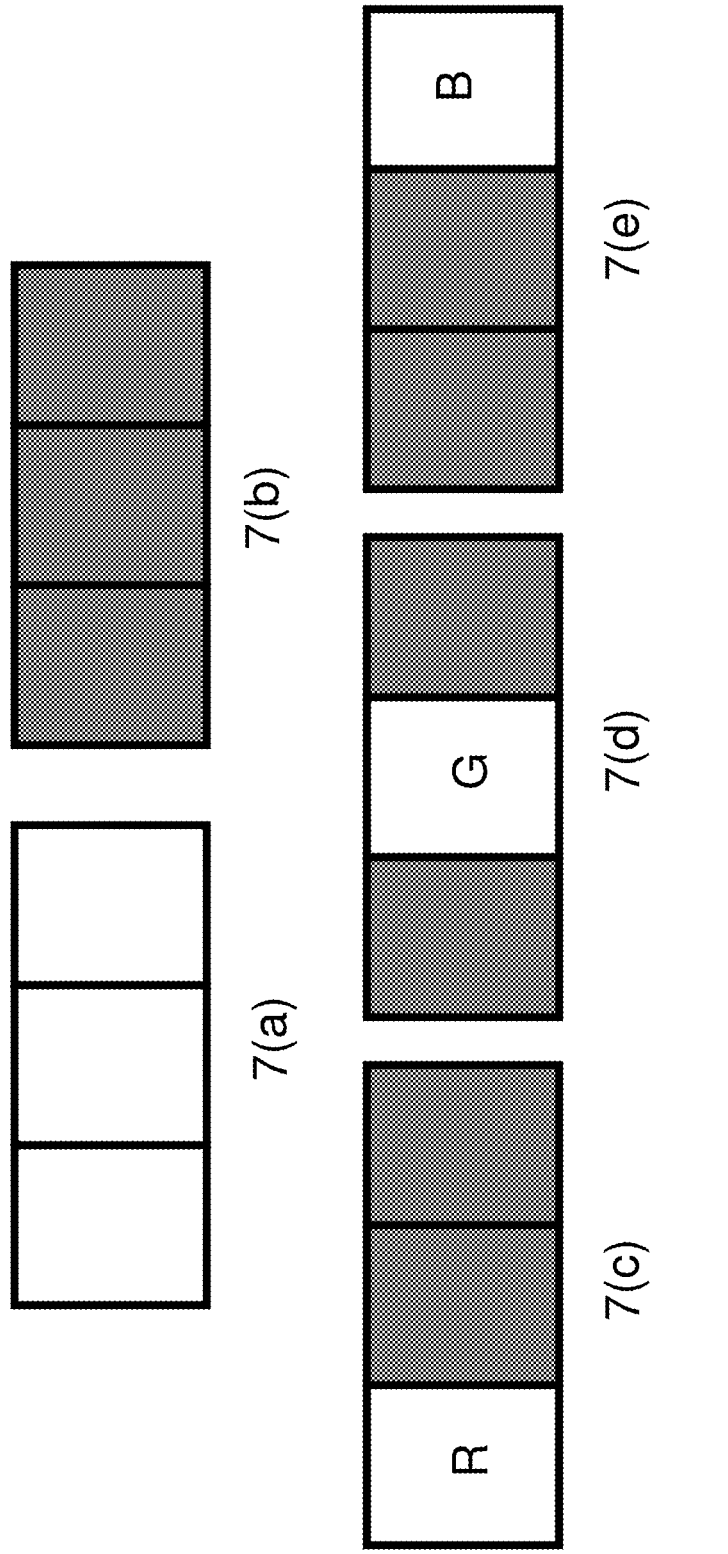
FIGS. 7(a)-7(e) show how a full color display of the present invention is realized.

In FIG. 7a, when a white pixel is desired, all three sub-pixels are turned to the white color state. In FIG. 7b, when a black pixel is desired, all three sub-pixels are turned to the black color state. FIG. 7c, when a red color is desired, one of the sub-pixels is turned to red and the remaining two sub-pixels are turned to the black state for maximum color saturation. Similarly, FIG. 7d and FIG. 7e display the green and blue colors respectively. Alternatively, in FIGS. 7c, 7d and 7e, one of the sub-pixels is driven to the color state while the remaining two sub-pixels are driven to the white state for maximum brightness (at the expense of the color saturation). Further alternatively, in FIGS. 7c, 7d and 7e, one of the sub-pixel is driven to the color state while the remaining two sub-pixels are driven to the black and white states, respectively.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. An electrophoretic fluid comprising a first type of pigment particles, a second type of pigment particles and a third type of pigment particles, all of which are dispersed in a solvent or solvent mixture, wherein:
   (a) the first type of pigment particles and the second type of pigment particles carry opposite charge polarities;
   (b) the third type of pigment particles has a charge level being less than about 50% of the charge level of the first type or the second type of pigment particles; and
   (c) the three types of pigment particles have different levels of threshold voltage, or different levels of mobility, or both.

2. The fluid of claim 1, wherein the first type of pigment particles and the second type of pigment particles are of the black and white colors, respectively.

3. The fluid of claim 1, wherein the third type of pigment particles is non-white and non-black.

4. The fluid of claim 3, wherein the third type of pigment particles is of a color selected from the group consisting red, green and blue.

5. The fluid of claim 1, wherein the three types of pigment particles have different levels of threshold voltage.

6. The fluid of claim 5, wherein one of the first type and the second type of pigment particles has a threshold voltage.

7. The fluid of claim 6, wherein the third type of pigment particles is larger than the first or the second type of pigment particles.

8. The fluid of claim 7, wherein the third type of pigment particles is about 2 to about 50 times larger than the first or second type of pigment particles.

9. The fluid of claim 6, wherein the third type of pigment particles carries the same charge polarity as one of the first and second types of pigment particles which has a threshold voltage.

10. The fluid of claim 1, wherein the three types of pigment particles have different levels of mobility.

11. The fluid of claim 10, wherein charge intensity of the first type of pigment particles is at least about 2 times charge intensity of the second type of pigment particles, and charge intensity of the third type of pigment particles is about 50% less than the charge intensity of the second type of pigment particles.

12. The fluid of claim 11, wherein the third type of pigment particles is larger than the first or the second type of pigment particles.

13. The fluid of claim 12, wherein the third type of pigment particles is about 2 to about 50 times larger than the first or second type of pigment particles.

14. A device comprising display cells filled with the fluid of claim 1, wherein the display cells are sandwiched between a common electrode layer and a layer of pixel electrodes.

15. The display device of claim 14, wherein the display cells are microcups.

16. The display device of claim 14, wherein the display cells are microcapsules.

17. The display device of claim 14, wherein the display cells are aligned with the pixel electrodes.

18. The display device of claim 14, wherein the display cells are not aligned with the pixel electrodes.

19. The display device of claim 14, wherein the third type of pigment particles is of the same color in all display cells.

20. The display device of claim 14, wherein the third type of pigment particles is of different colors in display cells.

21. The display device of claim 14, which is driven by a voltage potential difference between the common electrode layer and a pixel electrode.

22. The display device of claim 21, wherein at least three different levels of voltage potential difference are applied to the common electrode layer and the pixel electrode.

* * * * *